Sept. 5, 1944.   E. G. EPPENBACH   2,357,640
COMBINATION GRINDER AND HOMOGENIZER
Filed April 7, 1942   3 Sheets-Sheet 1

INVENTOR
EDWIN G. EPPENBACH
BY
HIS ATTORNEY

Sept. 5, 1944. E. G. EPPENBACH 2,357,640
COMBINATION GRINDER AND HOMOGENIZER
Filed April 7, 1942 3 Sheets-Sheet 2
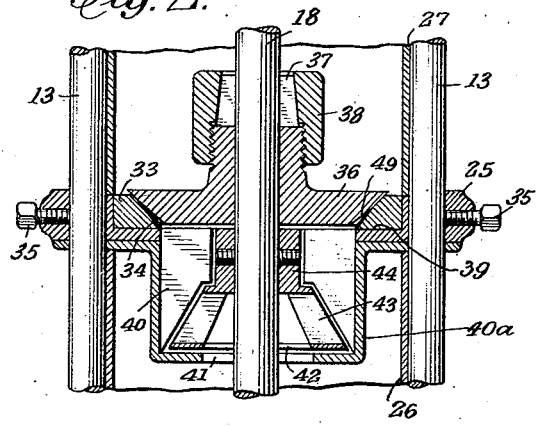
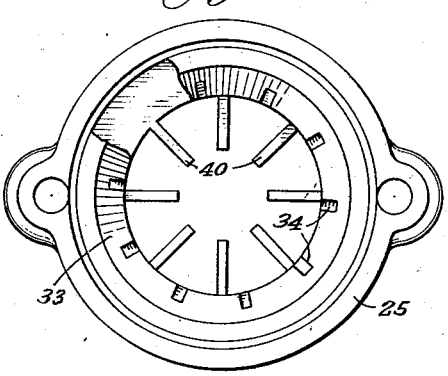
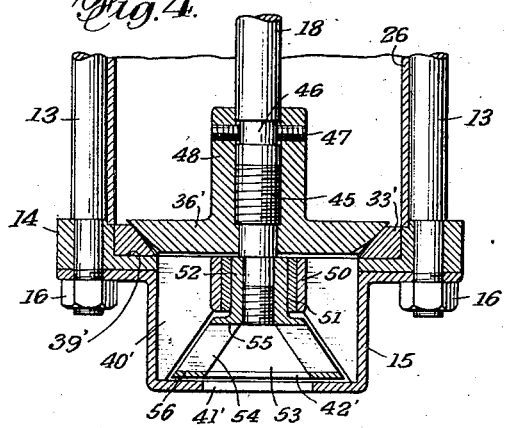
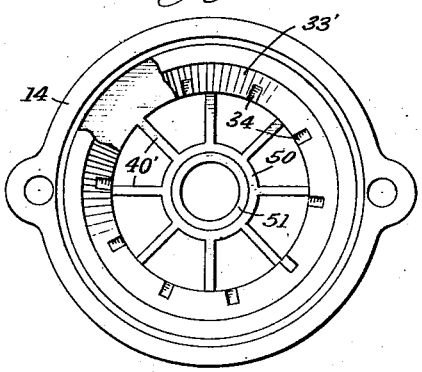
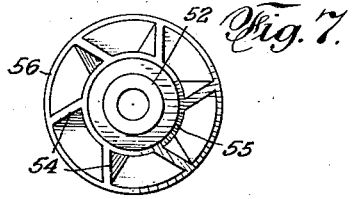
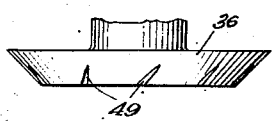
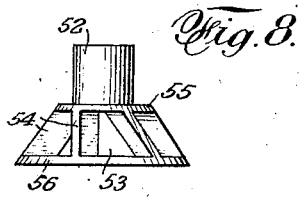
INVENTOR
EDWIN G. EPPENBACH
BY
HIS ATTORNEY

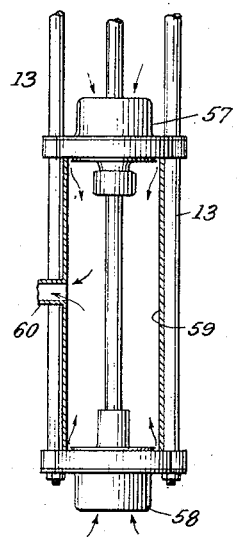
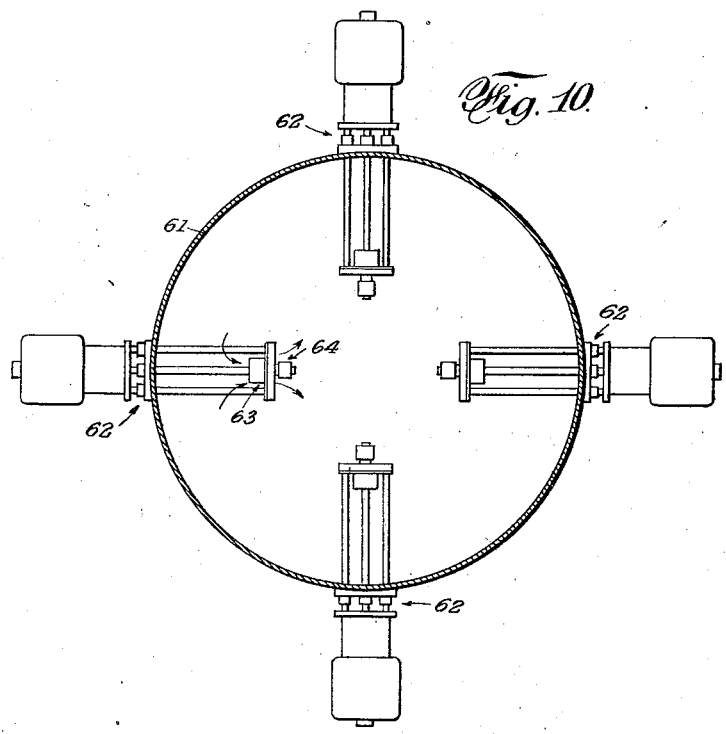
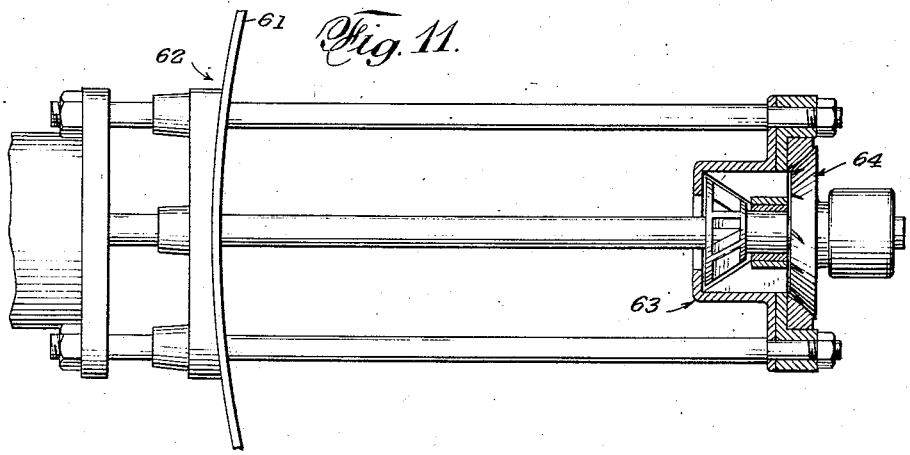
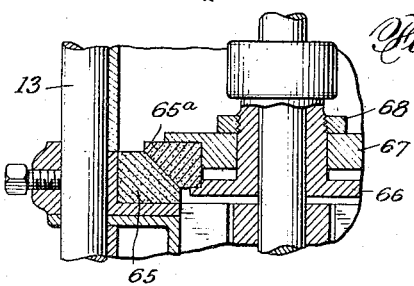

Patented Sept. 5, 1944

2,357,640

UNITED STATES PATENT OFFICE 2,357,640

COMBINATION GRINDER AND HOMOGENIZER

Edwin G. Eppenbach, Manhasset, N. Y.

Application April 7, 1942, Serial No. 437,977

6 Claims. (Cl. 83—13)

This invention relates to a combination grinding and homogenizing device adapted to mechanically grind and hydraulically shear matter and violently mix liquid and ground matter in a state of high turbulence, thus effecting complete homogeneousness of the mixture. The device is intended to be either stationary or portable and applicable for use in vertical, horizontal, or in any other position, and is especially adapted in its portable form for grinding and homogenizing liquid or semi-liquid substances in their original containers. The device is relatively simple and inexpensive and completely self-contained. It is designed to operate noiselessly and without vibration, and has the very important advantage of operating without drawing air into the material subjected to treatment by the device. The apparatus consists of a power source, such as an electric motor, a support for the power source, a framework extending from the support, a bridge plate serving both as guide for the framework and as means for attaching the device to any container, and which bridge plate is adjustable relative to the framework, and a combination grinding and turbine instrumentality located at the end of the framework. This combination grinding and turbine instrumentality is driven by the shaft of the motor, which latter extends centrally within the framework, and may be mounted in two different positions, one wherein the turbine is nearer to the power source, while the grinder extends from the end of the frame, or the other position at which the turbine extends from the end of the frame, while the grinder is nearer to the power source. Furthermore for certain purposes a reservoir may be provided within the framework to extend from the combination grinder and turbine device either towards the power source or away from the latter, depending upon the position of the turbine and grinder in respect to one another. In addition a plurality of combination grinder and homogenizing devices may be arranged either in successive stages, or in any other desired combination for more effectively grinding and mixing liquid or semi-liquid material to the desired state of homogeneousness.

The prime object of the present invention, therefore, is to provide a relatively simple, inexpensive and highly effective, readily portable, combination grinding and homogenizing device, which is applicable either singly or in any desired multiple arrangement for use with existing vessels containing liquid or semi-liquid matter.

Another object of this invention is to provide a combination grinding and homogenizing device of the kind indicated, wherein the grinder and turbine instrumentality may be positioned at any desired relation in respect to the power source driving the device, and wherein the grinding instrumentality may be adjusted to provide for any desired degree of fineness in the grinding operation of the device and for taking up wear of the grinding surfaces.

The foregoing and still further objects and important advantages of the present invention will become more fully apparent from the ensuing description, in connection with the accompanying drawings, which latter show several presently preferred forms of construction, but which by no means are intended to restrict the instant invention to the constructions illustrated, and wherein:

Fig. 2 illustrates a vertical detail view in section of one embodiment of my combination grinder and homogenizer, used as second or intermediate stage unit, indicated at the center of Fig. 1;

Fig. 3 is a top view of a typical grinder and turbine stator assembly of an intermediate unit, such as shown in Fig. 2, with the rotors removed;

Fig. 4 is an enlarged detail view in section of a "first stage" combination grinder and homogenizer unit, such as shown at the bottom of the device in Fig. 1;

Fig. 5 is a top view of a first stage unit stator assembly, employed in Fig. 4, with the rotors removed;

Fig. 6 illustrates a typical construction of a grinder rotor;

Fig. 7 illustrates the top view of the turbine rotor;

Fig. 8 is a side elevation thereof;

Fig. 9 illustrates a combination of two grinder and turbine units similar to those shown in Fig. 1, but in reverse position to one another;

Fig. 10 illustrates the application of my device for use in horizontal position with large tanks;

Fig. 11 is an enlarged partial detail view of one of the devices employed in Fig. 10; and Fig. 12 is a partial enlarged detail view in section of a grinder and turbine unit provided with a grinder construction, wherein a non-metallic stator and a similar rotor is employed.

Figure 1:
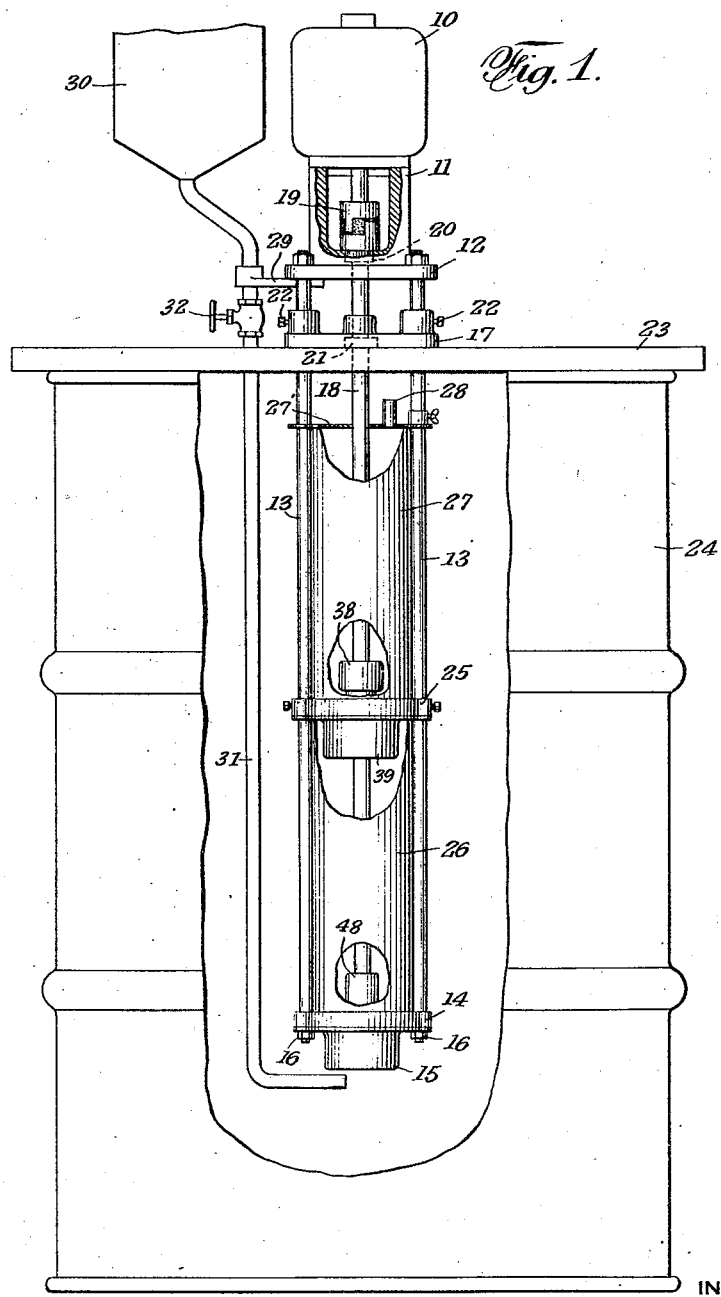
Fig. 1 is an elevation, with portions shown in section, of my device as employed in connection with an existing barrel.

Referring now specifically to the figures, starting with Fig. 1, numeral 10 denotes a power source such as an electric motor, resting upon a hollow motor support 11, which latter is provided at its bottom with flange 12. From this flange extends downwardly a framework consisting of at least two guide rods 13, at the lower end of which is provided a stator assembly 14. Adjacent to the latter there is a turbine stator housing 15, which is held in fixed position with stator assembly 14 by nuts 16, engaging the ends of the guide rods. Below flange 12 of the motor support there is shown a bridge plate 17 provided with three hubs, the two outer hubs accommodating and guiding rods 13, and an inner hub serving as guide for the motor driven shaft 18. Within the hollow motor support is housed a shaft coupling 19, which joins the motor shaft with shaft 18. At the bottom of the motor support there is provided an end thrust bearing 20 for shaft 18 and coupling 19, and a guide bearing 21 is mounted in bridge plate 17 below the central hub.

Bridge plate 17 is adjustable relative to guide rods 13 and may be set at desired positions by set screws 22. The bridge plate serves as means for attaching the device to existing vessels and is shown resting upon a plank or any other suitable support 23 placed over the top of barrel 24.

Midway between the bottom stator assembly 14, accommodating the first stage grinder and turbine unit, and plank 23 there is arranged another second stage grinder and turbine unit. This latter device is suspended by an adjustable stator assembly 25, which may be moved in relation to both guide rods and shaft 18.

The detail construction of the intermediate or second stage combination grinder and turbine unit is shown in Figs. 2 and 3, and the detail arrangement of the bottom or first stage unit is illustrated in Figs. 4 and 5. Between the bottom and intermediate units a reservoir 26 is placed, connected through the second stage unit with another, upper reservoir 27, provided with a removable deflector plate 27', and which latter has an outlet 28. From bridge plate 12 there extends a bracket 29 for supporting a supply tank 30 and a pipe line 31 controlled by valve 32, the pipe line leading to beneath turbine stator housing 15.

Referring now to Figs. 2 and 3, the second stage grinding and homogenizing unit consists of an exchangeable grinding stator 33, provided with radial, inclined recesses 34, having sharp cutting edges, and which recesses are uniformly distributed over the circumference of the stator. The latter is lodged in a supporting ledge in stator assembly 25, which is adjustably mounted upon guide rods 13 of the frame, and may be clamped in position by set screws 35. In operative engagement with the stator is a grinder rotor 36, provided with an externally threaded neck and a conical, split neck extension 37. Over this extension is placed a clamping nut 38, which engages with its conical interior neck extension 37, and with its internal thread the threaded neck portion of rotor 36. When nut 38 is tightened, split extension 37 will forcibly engage shaft 18, whereby the rotor may be held at any desired position upon shaft 18 to effect its proper adjustment in respect to grinder stator 33. Stator assembly 25 comprises a structure providing not only a suitable seat 39 for exchangeable grinder stator 33, but includes the turbine stator as well. The latter consists of a plurality of radial vanes 40 having outwardly tapering lower portions. Below stator assembly 25 is placed a housing 40a, which fits snugly over and intimately engages the outer vertical edges of radial turbine stator vanes 40, as clearly seen in Fig. 3. Housing 40a has a bottom opening 41, which corresponds in size to the open end 42 of turbine rotor 43. The latter is mounted upon shaft 18 by means of its hub 44, held against movement by suitable means, such as the set screws indicated. The structure of the grinder and turbine rotors will be explained presently.

A slightly different structural arrangement of a combination grinder and homogenizer is illustrated in Figs. 4 and 5. It is primarily designed for use at the end of the framework of the device, and may be used in either the position indicated in Fig. 4, or in reversed position, depending upon the desired direction of flow of the fluid to be treated. Stator assembly 14 accommodates in seat 39' replaceable stator grinder 33', which latter cooperates with adjustable grinder rotor 36'. In this construction shaft 18 is threaded at 45, and above this threaded portion there is provided a recess 46 in the shaft, which recess is longer than the diameters of set screws 47, provided in internally threaded hub 48 of rotor 36'. Through the thread engagement between the shaft and the hub, grinder rotor 36' may be readily adjusted upon the shaft in respect to grinder stator 33', and set screw 47 serve for fixing the rotor in its adjusted position. The arrangement of grinder stator and grinder rotor is similar to that shown in Fig. 2. The grinder rotor is shown in detail in Fig. 6. In its grinding face are provided tangentially arranged tapered recesses 49, having sharp cutting edges, and which recesses cooperate with radial cuts 34 of the grinder stator.

It is to be noted that the radial recesses or cuts 34 in the grinder stator, and the tapered tangential recesses 49 of the rotor extend only partly into the grinding faces of the two instrumentalities, so that the broader, unrecessed portions of these faces may be brought into close proximity to one another, thus facilitating a close grinding operation. These recesses have a double function. First, they pre-cut or pre-mince the matter to be treated, and then force and feed the pre-cut matter into the very narrow space or passage between the unbroken surface portions of the stator and rotor.

From the body of the stator assembly 14 there extend radially turbine vanes 40', which in this construction are joined by a center ring 50. Within the ring is provided a bearing sleeve 51, adapted to cooperate with hub 52 of the turbine rotor 43. Through this arrangement the rotor is effectively journaled within the stator. The rotor is joined with the reduced end portion of shaft 18 by means of a thread connection.

The turbine rotor, illustrated in detail in Figs. 7 and 8, consist of a generally cone-shaped structure provided with inclined vanes 54, serving as connections between an interior, upper horizontal flange 55, extending from hub 52, and an exterior lower flange or ring 56. Vanes 54 thus divide the structure into a series of inclined pockets. Stator housing 15 corresponds to housing 40a of Fig. 2 and is also provided with a bottom opening 41', which opening registers with ring opening 42' of the turbine rotor.

The arrangement of the combination grinder and turbine units shown in Figs. 2 to 8, inclusive, operate on the principle of drawing liquid or semi-liquid matter into the turbine housings (15 and 40a), and forcing it into the recesses provided in the faces of the grinder stators and rotors. Consequently the forced-in matter is not only mechanically ground by the grinder members, but also hydraulically sheared, whereupon it is propelled by centrifugal force through the grinding faces in outward direction. The walls of the reservoirs surrounding the grinders direct the thus treated matter in upward direction, until it is discharged through the outlet into the container in which the device operates. The now discharged matter is again drawn into the device by the force of the turbines, whereby the contents of the container is being constantly subjected to a violent turbulent agitation, while the device operates, and provides the highest possible degree of homogeneousness of the matter treated.

The arrangement shown in Fig. 1 illustrates a device with two stages for homogenizing material and serves to show the practicability of employing my combination grinder and homogenizer units in series. Evidently more than two units may be coupled in series in order to provide either a quicker homogenizing effect or to produce a finer grinding operation.

Referring now to Fig. 9, a somewhat different arrangement of two cooperating units is illustrated, wherein one unit operates against the other. The upper unit, indicated at 57, is intended to operate in downward direction, while the other unit 58 is intended to operate in upward direction, whereby the matter subjected to the combination grinding and homogenizing processes is forced against each other within reservoir 59 and out through outlet 60. This construction may be used either in vertical or horizontal positions.

Another form of employment of my device is shown in Fig. 10, where a large tank 61 is equipped with a plurality of horizontally disposed individual combination grinder and homogenizing units 62, arranged and operating radially against the center of tank 61. In order to produce the effects desired, the turbine ends of the devices, indicated in detail at 63 in Fig. 11, face the wall of the tank, while the grinders 64 are directed towards the center of the tank. By this arrangement the contents of the tank is drawn from its periphery towards its center, where the streams issuing from each one of the units meet and are deflected sidewise and back against the periphery, whereupon the fluid is again drawn in by the turbines.

In Figs. 2 to 5, inclusive, grinders are illustrated having grooved stators and rotors, and are preferably made of metal. In Fig. 12 a modified form of a rotor and stator is shown, wherein the grinding instrumentalities are in the form of inserts, preferably of a non-metallic nature, such as stone, Carborundum or other suitable abrasive material. The stator inlay 65 in this case replaces stators 33 and 33' of Figs. 2 and 4, whereas the rotor constitutes a clamping chuck, within which grinding element 65a is held. The chuck consists of a hub-equipped, flanged member 66, which latter resembles the rotor construction shown in Fig. 2. In engagement with the hub of member 66 is a clamping ring 67, which may be moved against member 66 and held in position by a nut 68. The inner faces of the flange of member 66 and of ring 67 are recessed for accommodating and holding replaceable grinding element 65a.

From the foregoing description of the structural details of my device it becomes clear that my combination grinder and homogenizer represents a very compact, easily portable, and readily attachable device, which may be employed for grinding and homogenizing of liquid or semi-liquid matter in almost any vessel to which access may be provided for inserting the device thereinto. While the construction of the device is simple and inexpensive, it is, nevertheless, highly efficient in providing the desired effects of grinding and violently agitating matter to such an extent that it becomes thoroughly homogenized, and therefore uniform in consistency. The device will homogenize and will facilitate the preparation of dyes, paints, inks, insecticides, asphalt emulsions, pulp, and many other liquid or semi-liquid products too numerous to mention, and may be relied upon to thoroughly grind the solid particles, subjected to both mechanical grinding and hydraulic shear, and to thoroughly homogenize the body of the product in that the finely ground particles are thoroughly dispersed or distributed within the vehicle carrying them. The fact that the grinding faces may be adjusted to the finest setting assures the grinding of solids to any desired degree. A very important factor in the operation of the present device is the fact that its effective mechanism is wholly submerged in the product to be treated, and therefore prevents the infiltration of air into the product. Therefore the treated matter is absolutely air free and contains nothing else but the ground solids and the vehicle supporting them.

It is to be noted that each combination grinder and turbine unit is so constructed that the turbine and grinder parts actually form continuations of one another, whereby not only a remarkable compactness, but the greatest possible simplicity in construction is achieved. The latter, translated into production cost, indicates the important factor of inexpensiveness.

While specific forms of my device are illustrated in the drawing and described in the foregoing, it will be readily understood that changes and improvements may be made therein, and I therefore reserve for myself the right to make such changes and improvements, without departing from the broad scope of my invention, as expressed in the annexed claims.

I claim:

1. In a combination grinding and homogenizing device, a motor, a hollow motor support, a shaft coupling in the support, guide rods extending from the support, a bridge plate accommodating said guide rods and being adjustable in respect to the latter, a stator support secured to the termini of the guide rods, a shaft extending from the coupling through the bridge plate into the stator support, end thrust and guide bearings for the shaft provided in said motor support and said bridge plate, respectively, a stator housing adjacent to the stator support, a turbine stator having radial vanes mounted in the stator housing, a grinder stator having radial recesses supported by the stator support, a grinder rotor having tangential recesses mounted upon said shaft and being adjustable thereupon in respect to the grinder stator, a turbine rotor provided with inclined pockets also mounted upon the shaft and cooperating with the turbine stator, the stator housing having a bottom opening approximately corresponding in size to that of the bottom opening of the turbine rotor.

2. In a combination grinding and homogenizing device, as set forth in claim 1, a reservoir extending from the stator support and having a deflector plate closing the reservoir at a point remote from the turbine, and an outlet provided in said plate.

3. In a portable grinding and homogenizing device, a power source, a shaft and a frame of spaced members extending from the power source, a combination grinder and turbine unit comprising stators and rotors, the stators of the unit being exchangeable, the rotor of the grinder unit being adjustable upon the shaft in respect to the stator, the faces of the stator and rotor of the grinder being provided with cooperating recesses and smooth grinding face portions; a bridge member for the spaced frame members in engagement with and adjustable axially in respect to the frame members and in respect to the shaft, and being adapted to serve for attaching the device to a vessel or the like, the rotor of the grinder being adjustable in respect to the stator, means for facilitating such adjustability for the rotor, pocket-like passages provided in the turbine structure, the cooperating elements of the turbine structure essentially forming continuations of the grinding surfaces of the grinder.

4. The combination with a power source, of a frame composed of a plurality of parallel members extending therefrom, a drive shaft from the power source centrally positioned in respect to the frame and at least one combination grinder and turbine unit removably secured to the frame and driven by the shaft, and means in engagement with and being adjustable relative to said frame members, a guide for said shaft provided in said adjustable means, the latter being adapted to serve for attaching the frame to a vessel, said grinder and turbine unit forming continuations of one another, said unit consisting of exchangeable grinder and turbine stators and rotors, the grinder stator having radial recesses, the grinder rotor having tangential recesses, the recesses of both the stator and the rotor extending only partially into their respective grinding faces, thus leaving relatively broad, unbroken peripheral surface portions, both the recessed and unrecessed face portions of the grinder elements cooperating with one another, the turbine stator serving as support for the grinder stator and having radial vanes, the turbine rotor having a plurality of inclined pockets, operating against said vanes, and a central opening leading to the pockets, a housing surrounding said vanes and the turbine rotor and having an opening corresponding to that of the turbine rotor.

5. The combination with a power source, of a frame composed of a plurality of parallel members extending therefrom, a drive shaft from the power source centrally positioned in respect to the frame and at least one combination grinder and turbine unit removably secured to the frame and driven by the shaft, and means in engagement with and being adjustable relative to said frame members, a guide for said shaft provided in said adjustable means, the latter being adapted to serve for attaching the frame to a vessel, said grinder and turbine unit forming continuations of one another, said unit consisting of exchangeable grinder and turbine stators and rotors, the grinder stator having radial recesses, the grinder rotor having tangential recesses, both recesses being provided at, but extending only partly into the grinding faces, thus leaving relatively broad unbroken peripheral surface portions, both the recessed and unrecessed face portions of the grinder elements cooperating with one another, the turbine stator serving as support for the grinder stator and having radial vanes, the turbine rotor having a plurality of inclined pockets, operating against said vanes, and a central opening leading to the pockets, a housing surrounding said vanes and the turbine rotor and having an opening corresponding to that of the turbine rotor, the grinder rotor being adjustable in respect to its stator.

6. The combination with a power source, of a frame composed of a plurality of parallel members extending therefrom, a drive shaft from the power source centrally positioned in respect to the frame and at least one combination grinder and turbine unit removably secured to the frame and driven by the shaft, and means in engagement with and being adjustable relative to said frame members, a guide for said shaft provided in said adjustable means, the latter being adapted to serve for attaching the frame to a vessel, said grinder and turbine unit forming continuations of one another, said unit consisting of a grinder and turbine stators and rotors, the stators being secured to the frame, the rotors being secured to the shaft, the grinder stator and rotor forming exchangeable elements made from abrasive material, and an adjustable, flanged chuck for accommodating and holding said rotor element in engagement with the shaft and having shaft clamping means which facilitate the adjustment of the chuck in respect to the shaft, whereby the rotor element may be adjusted in respect to the stator element.

EDWIN G. EPPENBACH.